United States Patent
Schons et al.

(10) Patent No.: US 12,311,382 B2
(45) Date of Patent: May 27, 2025

(54) METHOD AND SYSTEM FOR SEPARATING DUST-CONTAINING MATERIAL MIXTURES FROM THE PROCESS OF RECYCLING ELECTRIC OR ELECTRONIC DEVICES

(71) Applicant: GS Gesellschaft für Umwelt- und Energie-Serviceleistungen mbH, Eigeltingen (DE)

(72) Inventors: Georg Schons, Eigeltingen (DE); Marc Schons, Eigeltingen (DE); Henrik Reske, Eigeltingen (DE)

(73) Assignee: GS Gesellschaft für Umwelt- und Energie-Serviceleistungen mbH, Eigeltingen (DE)

( * ) Notice: Subject to any disclaimer, the term of this patent is extended or adjusted under 35 U.S.C. 154(b) by 240 days.

(21) Appl. No.: 17/914,014

(22) PCT Filed: Mar. 15, 2021

(86) PCT No.: PCT/EP2021/056457
§ 371 (c)(1),
(2) Date: Sep. 23, 2022

(87) PCT Pub. No.: WO2021/190964
PCT Pub. Date: Sep. 30, 2021

(65) Prior Publication Data
US 2023/0138897 A1    May 4, 2023

(30) Foreign Application Priority Data
Mar. 25, 2020   (DE) .......................... 102020108204.5

(51) Int. Cl.
*B03B 9/06* (2006.01)

(52) U.S. Cl.
CPC ............... *B03B 9/061* (2013.01); *Y02P 10/20* (2015.11); *Y02W 30/52* (2015.05)

(58) Field of Classification Search
CPC ...... Y02W 30/82; Y02W 30/52; B03B 9/061; Y02P 10/20; Y02P 10/00
See application file for complete search history.

(56) References Cited

U.S. PATENT DOCUMENTS 5,829,694 A    11/1998   Chapman

FOREIGN PATENT DOCUMENTS

| CN | 1966165 A | * | 5/2007 |
| CN | 110434158 A | | 11/2019 |

(Continued)

OTHER PUBLICATIONS

Translation of CN-1966165 (Year: 2007).*

(Continued)

*Primary Examiner* — Bobby Yeonjin Kim
(74) *Attorney, Agent, or Firm* — Bachman & LaPointe, P.C.

(57) ABSTRACT

The invention relates to a method and a system for separating dust-containing material mixtures which contain fibers, preferably glass fibers, and have heavy metal (SM) and/or precious metal (EM) from the process of recycling electric or electronic devices, wherein the method has at least one step (S1) of mechanically releasing particles from fiber-containing mixed material agglomerates in a dry manner and at least one step (S2) of mechanically releasing fiber-containing mixed material agglomerates in a dry manner.

19 Claims, 1 Drawing Sheet

(56) References Cited

FOREIGN PATENT DOCUMENTS

| | | | | |
|---|---|---|---|---|
| DE | 4041385 | A1 | 7/1992 | |
| DE | 4213274 | A1 | 10/1993 | |
| DE | 19518277 | C1 * | 5/1996 | ........... B02C 19/186 |
| EP | 0403695 | A1 | 12/1990 | |
| JP | H09150136 | A | 6/1997 | |
| JP | 2000135450 | A | 5/2000 | |
| JP | 2016203054 | A | 12/2016 | |

OTHER PUBLICATIONS

Translation of DE-19518277 (Year: 1996).*
International Search Report and Written Opinion dated Jul. 15, 2021 for corresponding application PCT/EP2021/056457.

* cited by examiner

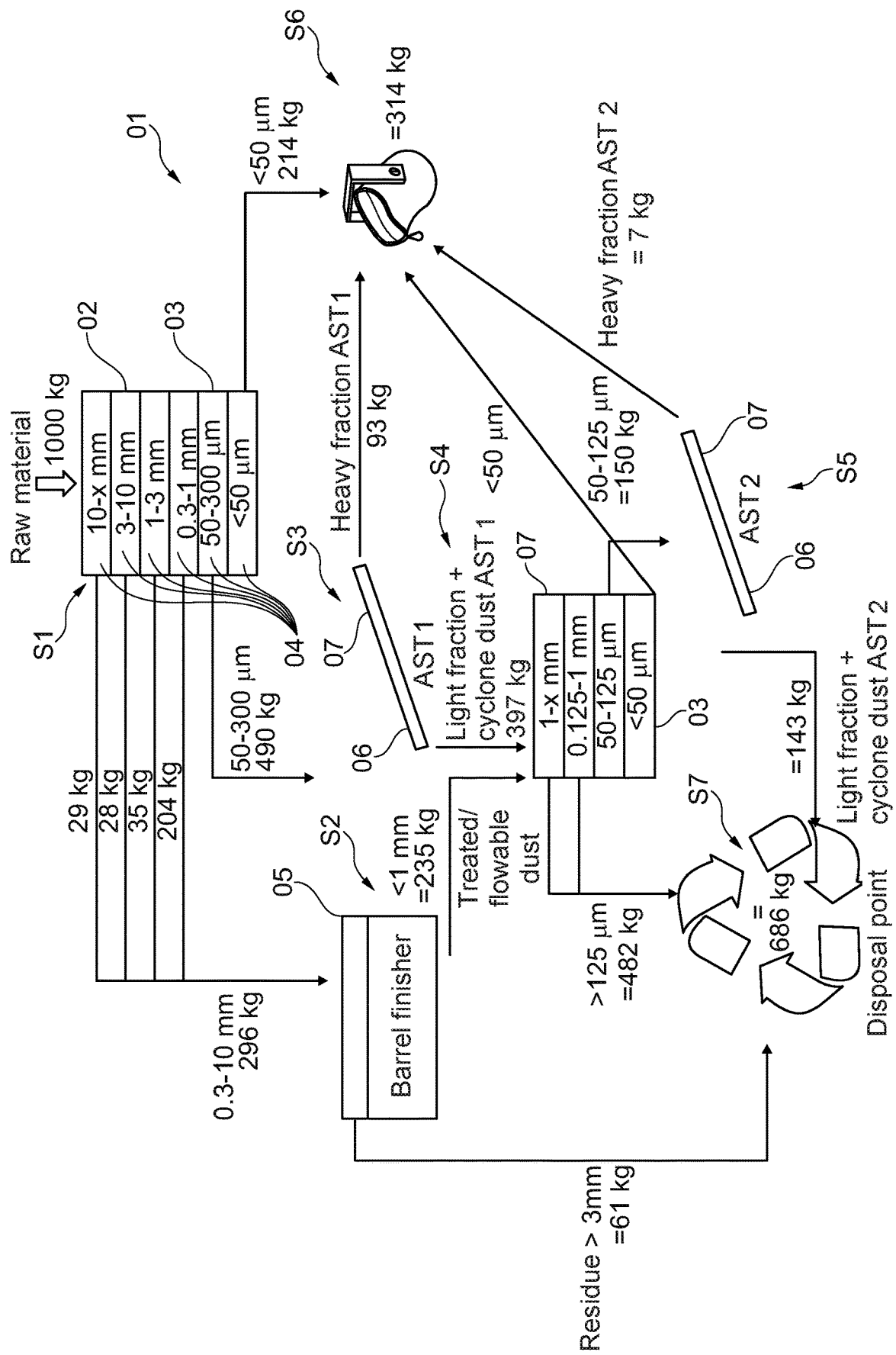

METHOD AND SYSTEM FOR SEPARATING DUST-CONTAINING MATERIAL MIXTURES FROM THE PROCESS OF RECYCLING ELECTRIC OR ELECTRONIC DEVICES

BACKGROUND OF THE INVENTION

The present invention relates to a method for separating dusty material mixtures containing fibers, preferably glass fibers, and comprising heavy metal and/or precious metal from the recycling of electric or electronic devices. Furthermore, the present invention relates to a system for separating dusty material mixtures containing fibers, preferably glass fibers, and comprising heavy metal and/or precious metal from the recycling of electric or electronic devices.

The recycling of electric or electronic devices involves the execution of known dismantling steps whose aim it is to safely dispose of substances harmful to health or the environment while recovering valuable materials, in particular metals, precious metals, and the like or, more generally, returning them to a product or material cycle.

Recycling, in particular mechanically dismantling or breaking up the electric or electronic devices, produces a significant amount of a dusty material mixture, which either has not been reprocessed or used further at all so far and has been largely landfilled instead or has been supplied to a smelting process for recovering metals and precious metals without substantial reprocessing steps. In the case of the dust smelted, the current and thus variable composition is responsible for profitability. With smelting costs of approximately 1000€ per ton of dust, different economic results, even economic losses, may occur depending on the composition of the dust. The value of the dust compositions of dust not smelted is unknown, which means that, while no smelting costs are incurred on the one hand, potentially valuable dusty materials, which will also be referred to as dust hereinafter, are not recycled on the other hand.

For this very reason, earlier documents, such as DE 195 18 277 C1, describe that finest fractions or dust fractions are not reprocessed further and disposed of instead in methods for reprocessing scrap of printed circuit board assemblies from electric or electronic devices.

Said dust or dusts are a material mixture which typically contains 1 wt % to 5 wt % particles of >10 mm in size and, consequently, 95 wt % to 99 wt % particles of less than 10 mm in size. Said dust typically occurs when breaking up the electric or electronic devices using shredders, impact mills, cutting mills, hammer mills or rotary shears. Other steps of processing, in particular mechanically breaking up, electric or electronic devices also lead to the production or generation of the dusty material mixture or the dust with the basic composition indicated above.

As explained above, the state of the art does not offer any methods or devices which allow the dust to be economically reprocessed or used further. Thus, enormous amounts of resources, in particular also of metals and precious metals, are lost for reprocessing or further use each year in the form of thermally utilized or landfilled dust; said resources have to be obtained with significant effort through primary mining process or primary production processes, which causes a greater $CO_2$ burden compared to recycling if nothing else.

EP 0 403 689 A1, which deals with methods for utilizing device scrap, has realized that the dusts contain significant amounts of the recyclable precious metals. Nevertheless, this prior art specifically intends for the dusts to be returned in a closed system, which is precisely what prevents the effective processing of the dusts since the dust fraction, while not being disposed of as was the case in DE 195 18 277 C1, is processed together with other fractions in the closed system, which significantly reduces the mass throughput and the yield or recovery rate and increases the amount of work instead.

The source material described above differs significantly from other source materials, such as materials from waste cable recycling. The latter materials also contain fibers; macroscopically, however, they form more of a grain or particle mixture with fiber contents. Also, in cable recycling, the potentially valuable components of the source material are not contained in fibers adhering to each other, in caught fibers and in balls of fibers, but in loose fibers. However, the fiber-containing mixed material from the recycling of electric or electronic devices contains, essentially based on the fiber-reinforced circuit boards, a type of fibers which is not valuable and which additionally has a strong tendency to form balls in which fibers adhere to each other—both mechanically and chemically or electrostatically—and additionally enclose or bind other particles. These structures, which are somewhat connected but connected nonetheless, will be referred to as mixed material agglomerates hereinafter, the term agglomerate being understood as a more or less solidified accumulation of formerly loose components in a composite which is produced by technical processes, namely the recycling, in particular the mechanical dismantling and/or breakup, of electric or electronic devices.

Consequently, the technology, which is described in DE 40 41 385 A1, for example, is not exactly suited to propose a method for separating dusty material mixtures containing fibers, preferably glass fibers, and comprising heavy metal and/or precious metal from the recycling of electric or electronic devices since the devices mentioned there, in particular bristle carpets or brush-like flat structures, are entirely unsuitable for handling balling material mixtures. They would merely be clogged or covered when subjected to balls without mixed material agglomerates containing fibers being mechanically and drily broken up even if the bristle carpets or the brush-like flat structures were set in vibration. After all, the very intention and what is described is that the bristles capture the fibers or strands between them, which would further solidify existing balls instead of breaking them up. With regard to the source material in question, only mixed material agglomerates in which cable insulations or other cable components have not detached from the metallic conductors would be an option in the first place. However, these agglomerates cannot be broken up by the teaching of DE 40 41 385 A1, either.

Furthermore, DE 4213 274 A1 and U.S. Pat. No. 5,829,694 A are known from the state of the art. The former publication deals with the material separation of composite materials containing metal, in particular printed circuit boards. The latter document also discloses a method and a device for separating metals in the recycling of printed circuit boards.

SUMMARY OF THE INVENTION

Against this background, the object of the present invention is to propose a method and a system for separating dusty material mixtures containing fibers, preferably glass fibers, and comprising heavy metal and/or precious metal from the recycling of electric or electronic devices which makes it possible for recyclable components, in particular metals and precious metals, to be enriched and thus for the dusty material mixture or the dust to be recycled within an economic scope overall.

This object is attained by a method having the features disclosed herein. With regard to the system, the mentioned object is attained by a system having the features also as disclosed herein. Advantageous embodiments are the subject matter of the dependent claims and/or are also disclosed herein.

The method according to the invention for separating dusty materials, which preferably contain fibers, from the recycling of electric or electronic devices provides at least one step for mechanically and drily detaching particles from mixed material agglomerates containing fibers and at least one step for mechanically and drily breaking up mixed material agglomerates containing fibers.

The idea underlying the present invention is based on the finding that a significant number of mixed material agglomerates in particular containing fibers are present in the dusty material mixtures or in the dusts, the material agglomerates for their part enclosing or binding particles or grains which would in principle be suitable for further processing or reuse but preventing such material particles at least from being screened and therefore separated.

Based thereon, the idea underlying the present invention is to free or remove as many of these particles, which are bound or cannot be screened and/or are not flowable, from the mixed material agglomerates by the mentioned steps, to which end it is intended for the particles to be detached from the existing agglomerates and for said agglomerates themselves to be broken up. This combination of steps according to the invention surprisingly allows such a large amount of flowable and potentially recyclable particles to be removed from the mixed material agglomerates, which then allow the particles to be separated or fractionated, which comprise one or more separation fractions with a thus increased concentration of recyclable materials, in particular metals or precious metals, that this not only makes an economic reprocessing or recycling possible but also reduces the portion of the source material that cannot be reprocessed or recycled.

The mixed material agglomerates containing fibers form balls or dust bunnies, in particular because of the fibers, such as glass fibers, which are used in large numbers in modern electric or electronic devices in the form of glass-fiber-reinforced plastics, preferably printed circuit boards or similar components. These loose fiber composite structures contained in the dust can bind, enclose or ball up with other particles and grains like house dust bunnies. This also means that the step of mechanically and drily breaking up mixed material agglomerates containing fibers primarily achieves the separation of fibers from each other. This means that the step effects a diffusion of the mixed material agglomerates.

A particular achievement of the method according to the invention consists in the implementation of the steps according to the invention as dry steps which do specifically not require the addition of a liquid solvent or a liquid transporting agent. After all, besides the additional energy input for subsequently drying the material fractions or the large mass which will have to be disposed of or the separation fractions, wet methods or steps also require the sometimes elaborate treatment of the liquid medium or the solvent or the transporting agent, which means that an economic separation in wet processes is presumably to be expected only for material compositions having a high metal concentration. Moreover, the wet process accepts a higher loss in valuable precious metals.

A fractionation into different grain sizes precedes each separating process. However, this requires for the materials to be screenable or flowable. However, this is exactly what does not yet apply to the untreated dusts from the recycling of electric or electronic devices mentioned above.

This is essentially due to the formation of balls or the balling up, which provides a type of material matrix or material scaffold in which other particles and grains are embedded or can be embedded, as a result of which they are no longer screenable or flowable. The result is the formation of mixed material agglomerates. Consequently, it is specifically not sufficient to separate or retain individual fibers in order to implement the invention. Instead, an improvement of the screenability and/or the flowability has to be accompanied by a breakup, separation, fragmentation and/or loosening of balled-up portions of the mixed material agglomerate so as to be able to free or detach particles therefrom.

Accordingly, the step for mechanically and drily breaking up mixed material agglomerates containing fibers is designed in exactly such a manner that a breakup, separation, fragmentation, diffusion and/or loosening of balled-up portions of the mixed material agglomerate is achieved.

Merely causing or inducing the balls or the mixed material agglomerates to vibrate typically does not suffice in this regard since the balls themselves are no static or rigid structures and react to external stimulation with elastic deformation or natural vibration without noticeably breaking up.

So within the scope of the method according to the invention, it is made possible for a major part of the portions of particles bound in the mixed material agglomerates containing fibers, which have not been available for separation before, to be made accessible to separation at all or to be "solubilized" for separation. In this way, an additional and/or parallel separation of the source material, i.e., the dust or the dusty material mixtures, can be made more effective in that a larger portion of the material is transferred into a flowable shape or a flowable state overall and can therefore be separated and, if applicable, processed recycled or reprocessed in appropriate dry separating processes.

According to a first advantageous embodiment of the method, the step of detaching the particles from the mixed material agglomerates containing fibers can be executed as a first step, for example. This allows particles bound or embedded less tightly in the mixed material agglomerates containing fibers to already be detached and/or separated. This, in turn, has the advantage that a lower material throughput has to be achieved in other steps, both in the step of mechanically breaking up mixed material agglomerates according to the invention and in the subsequent separating steps or fractionating steps.

Advantageously, a fractionation, preferably of three to eight fractions, according to particle sizes can be carried out simultaneously in the step of detaching particles from the mixed material agglomerates. This has the advantage that a fractionation, in particular a pre-fractionation or a first fractionation of the input material, is carried out simultaneously to detaching the particles from the mixed material agglomerates, i.e., that further processing or further treatment can be carried out selectively for the fractions thus produced. Preferably, a common or unitary system device which allows both fractionating and detaching particles from the mixed material agglomerates can be used for this purpose.

The precious metals are preferably found in fractions with a grain size of <300 µm. The heavy metals are preferably found in fractions with grain sizes between 300 µm and 1000 µm. The coarser valuable particles are typically easy to comminute and would increase the portions of the particles not bearing precious metal if comminuted excessively and therefore ultimately increase the recycling costs. Hence, it is advantageous for a fraction of <300 µm and free particles to be separated first, which also further increases the concentration of the valuable particles.

According to the invention, a fraction with up to 100 µm, preferably up to 50 µm, is accordingly separated directly for smelting since an above-average concentration of valuable particles is present in this fraction. This can take place by means of a tumbler screen, for example. Only the small/fine particles enclosed in larger structures or agglomerates should be gently stripped by the separating device and be screenable thereafter. The separating device or the comminuting device will also be referred to as a flowability box hereinafter. This is to mean that there are different approaches and mechanisms that can achieve the separation.

For example, the step of detaching the particles from mixed material agglomerates executed first can be implemented by treating the dust in a tumbler screen with six different screen fractions, for example. In this process, the particles can be detached from the mixed material agglomerates in particular by means of vibration. Hence, it may also be advantageous for said treatment or the execution of said step to be carried out for as long as possible since a longer exposure to the vibration detaches a correspondingly larger portion of the particles from the mixed material agglomerates. As described above, such an execution of the step for mechanically or drily detaching particles by screening in a tumbler screen not only detaches the particles from the mixed material agglomerates but advantageously also effects a fractionation, such as a first fractionation, into fractions with different particle sizes at the same time. These fractions can be selectively processed further. For example, screen fractions having a particle size of, e.g., less than 100 µm, preferably less than 50 µm, in at least one dimension or spatial direction can be directly separated or sorted out into a final fraction or a reprocessing fraction since the fine or fine-grained material thereof has a relatively high number of recyclable portions, in particular precious metal portions.

An additional mechanical and dry separating method can be applied to a medium-grained fraction, e.g., a fraction with particles in the size range between 100 µm and 300 µm, preferably between 50 µm and 300 µm, to produce or obtain fractions with potentially more recyclable or reprocessable component concentrations.

According to another particularly preferred embodiment of the method, a fractionation, preferably of two to three fractions, according to particle sizes can simultaneously be carried out in the step of breaking up mixed particle agglomerates. In this manner, said step can also particularly advantageously not only provide the prerequisite for a further detaching of particles, in particular recyclable or reusable particles, from the mixed material agglomerates but simultaneously also effect a separation or a fractionation, which at least partially effects an early separation of the particles freed, stripped or otherwise detached from the mixed material agglomerates. The fact that the breakup of the mixed material agglomerates containing fibers transfers a plurality of otherwise inaccessible or bound particles into a flowable and therefore further processable, in particular separable, state is particularly advantageous.

Particularly preferably, a manipulation reducing the adherence of fibers among each other, in particular a surface manipulation of the fibers and/or a shortening of the fibers and/or a spatial separation of the fibers, preferably of a pre-fractionated portion of the material mixture or dust, is carried out in the step of breaking up mixed material agglomerates. In this context, it has proven particularly effective to manipulate the surfaces of the fibers, in particular to smooth the surfaces of the fibers, to shorten the fibers themselves and to spatially separate the fibers from each other in combination with the breakup of the mixed material agglomerates. All these manipulations, both individually and in combination with each other, enable an effective breakup of the mixed material agglomerates overall with the result that particles enclosed or bound in the mixed material agglomerates are released or can be released.

In this context, it can be particularly advantageous if a crushing and/or grinding and/or milling process, preferably of a pre-fractionated portion of the material mixture, is carried out in the breakup step. Different crushing and/or milling processes and/or grinding process known per se can be employed. As explained in the beginning, however, the prerequisite for this is that said process can be executed dry, i.e., without the addition of a liquid in the form of a solvent or a transporting agent. Different process or setups have proven particularly advantageous. For one, an effective breakup of mixed material agglomerates can be achieved by treating them in a rod mill device. The rod mill device has both an effect on the surface properties of the fibers, in particular a smoothing effect, and an effect on the mixed material agglomerates which spatially separates the fibers from each other. Likewise, a particularly advantageous process can be achieved by means of a modified barrel finishing device, in particular a barrel finishing device adapted for dry operation. Barrel finishing devices of this kind are also known as circular vibrators or cylindrical grinders, which are typically operated wet, i.e., with a liquid, preferably aqueous, additive, however. Abrasive products made of different materials, preferably mineral materials, and with different shapes or surfaces can be used.

According to another advantageous embodiment of the method, at least one other separating and/or fractionating step, preferably three other separating and/or fractionating steps, can be carried out, the material mixture produced by the step of breaking up the mixed material agglomerates, in particular a material fraction produced in said step, being preferably supplied as a material input in at least one separating and/or fractionating step. A method for a separation according to specific weight, e.g., a method for a separation into a heavy fraction and a light fraction, can be understood as the separating step. A method for a separation according to grain sized can be understood as the fractionating step. This material or this material fraction as the material input may be joined, combined or mixed with another material fraction, e.g., a material fraction from the step of mechanically and drily detaching particles from the mixed material agglomerates containing fibers according to the invention. The other separating and/or fractionating steps are also carried out dry, i.e., without a liquid solvent or transporting agent, so as to keep or execute the entire method dry. For example, the other separating and/or fractionating steps can be carried out by means of air separation tables and/or tumbler screening devices.

According to another particularly preferred embodiment of the method, the separating and/or fractionating steps and the fractions produced therein can lead to or produce a ramified material flow, in which two or more fractions from different separating and/or fractionating steps, in particular from different separating and/or fractionating devices, are merged in at least one point. This makes the material flow overall and the concentration of recyclable materials, in particular precious metals, particularly effective. Also, this allows material components or fractions whose composition does not warrant reprocessing or recycling and which are therefore landfilled or thermally utilized to be discarded or sorted out particularly effectively.

According to another preferred embodiment of the method, fractions produced in the method, in particular fractions with particle sizes of less than 100 μm, preferably less than 50 μm, produced in the method can be subjected to smelting or supplied to a refinery in order to recover metals and precious metals, in particular.

With regard to a system for separating dusty material mixtures containing fibers, in particular glass fibers, and comprising heavy metal and/or precious metal from the recycling of electric or electronic devices, the object mentioned above is solved by the fact that a detaching device for mechanically and drily detaching particles from mixed material agglomerates containing fibers, preferably glass fibers, and at least one separating device for mechanically and drily breaking up mixed material agglomerates containing fibers, preferably glass fibers, are provided.

The devices can be disposed or formed at a spatial distance from each other in principle. Alternatively, the system can be configured in an integrated manner, the devices being connected to each other or integrated into each other. A direct material flow or a direct material transport can be established between the devices according to the invention of the system and other devices of the system, which can preferably be provided. Likewise, it is also possible, however, that individual portions, in particular individual fractions, of the dusty material mixture or the dust are stored and/or temporarily stored in suitable containers as input material for the use in one of the devices until they are processed further or treated further at a suitable point in the system according to the invention, i.e., by the suitable device, or removed from the system. As described above, the combination of a detaching device and a separating device of mixed material agglomerates containing fibers, preferably glass fibers, in a system for separating dusty material mixtures or dusts in particular containing glass fibers from the recycling of electric or electronic devices has the surprising effect that this transfers a significantly larger portion of recyclable materials, in particular precious metals, into a flowable state and therefore into a state which basically allows fractionating or separating per se with the result that the large amounts or large volumes of dusts or dusty material mixtures occurring in the recycling, in particular the mechanical recycling, of electric or electronic devices can be separated significantly better, thus achieving a significantly better concentration of recyclable components or constituents of the dusts, which in turn has the effect that said dusts can be economically reprocessed or recycled in the first place.

According to the invention, both the separating device and the detaching device are configured as devices which are operated dry, i.e., without the addition or input of a transporting liquid or a separating liquid.

With regard to the features and advantages of the system according to the invention, reference is made overall to the preceding description of the method according to the invention to avoid redundancies. Features disclosed in relation the method shall also be deemed disclosed in relation to the system according to the invention and vice-versa.

According to a first advantageous embodiment of the system, the detaching device for detaching the particles can be provided and/or disposed as an inlet device of the system. This means that the dust or the dusty material mixture originating from the recycling of electric and electronic devices is first supplied to the detaching device as defined in the beginning, in which at least part of the particles bound in the mixed material agglomerates containing fibers is mechanically detached and thus transferred into a flowable state allowing fractionation.

Furthermore, the detaching device can advantageously also comprise means for fractionating the material mixture, preferably into three to eight fractions, according to particle sizes. In addition to the detaching or the release of particles from the mixed material agglomerates containing fibers, if possible, this allows an early separation or fractionation of both the particles present in a loose or unbound state per se and particles mechanically detached, freed or removed from the mixed material agglomerations, and the respective fractions can subsequently be processed further or used further in an effective manner.

Particularly preferably, the detaching device can be a tumbler screen. The screens used in a tumbler screen can have different mesh widths and can provide respective cleaning mechanisms. Ball cleaning can be employed for larger screens. Finer screens may be cleaned or operated with ultrasonic cleaning.

Furthermore, the separating device or the flowability box can also comprise means for fractionating the material mixture, preferably into two to three fractions. This, too, ensures not only that the mixed material agglomerates containing fibers are broken up but also that the particles that have thus been detached or freed from the mixed material agglomerates and which are in a flowable state are already divided into corresponding fractions, which facilitate or improve further processing.

Particularly advantageously, the separating device can comprise means which effect a severance of an adherence of fibers among each other, in particular a surface manipulation of the fibers and/or a shortening of the fibers and/or a spatial separation of the fibers, preferably of a pre-fractionated portion of the material mixture. Reducing the adherence of the fibers among each other makes the breakup of the mixed material agglomerates containing fibers particularly effective.

Particularly preferably, the separating device can comprise means for grinding and/or milling the material or the dust, preferably a pre-fractionated portion of the material mixture.

Particularly preferably, the separating device can be a barrel finishing device and/or a rod mill device modified for dry operation. Said devices have proven particularly effective with regard to the breakup of mixed material agglomerates containing fibers, in particular glass fibers. Apparently, both barrel finishing devices and rod mill devices are particularly capable of effectively smoothing the surfaces of the fibers, in particular the glass fibers, shortening the fibers and/or separating the fibers from each other, each process, but especially also a combination of said processes, leading to an effective breakup of the mixed material agglomerates containing fibers, in particular glass fibers. Said barrel finishing device, the cylindrical grinder and the circular vibrator can be operated with star-shaped abrasive products in the size range of 5 mm to 15 m per spatial direction, for example. Suctioning, in particular a suctioning device, which removes and/or separates smallest particles can be provided.

Furthermore, the system can advantageously comprise at least one other separating and/or fractionating device, preferably three other separating and/or fractionating devices, the material mixture produced by a separating device, in particular a material fraction produced by the separating device, being preferably supplied as material input in at least one separating and/or fractionating device. In a particularly advantageous manner, this allows the material mixtures, in particular fractions, which have been produced in the separating device and in which mixed material agglomerates containing fibers, in particular glass fibers, have been disaggregated or broken up accordingly and thus corresponding particles or material mixtures have been released or freed to be subjected to a separation and/or fractionation again or once more with the result that an effective concentration of recyclable or treatable materials or material fractions is ensured.

The other separating and/or fractionating devices can advantageously also be air separators, preferably air separation tables, and/or tumbler screens. It has been found that these devices can be integrated into the system according to the invention in a particularly positive and effective manner and lead to an effective concentration of potentially recyclable material mixtures overall. A particular advantage of air separation tables is that they separate the introduced material into a light fraction and a heavy fraction based on different relative densities. This separation can be a particularly positive addition to the grain-size-based fractionation in other steps of the method according to the invention since this enables a concentration of particles with high relative density, such as is present in the case of precious or heavy metals.

BRIEF DESCRIPTION OF THE DRAWINGS

Advantages and embodiments of the present invention will be described with reference to the schematic drawing below.

FIG. 1 is a schematic illustration of a system according to the invention including a schematic illustration of the steps of a method according to the invention.

DETAILED DESCRIPTION

FIG. 1 shows a system 01 according to the invention for separating dusty material mixtures, which preferably contain fibers, in particular glass fibers, from the recycling of electric or electronic devices. System 01 comprises a detaching device 03 as an inlet device 02, detaching device 03 already detaching particles from mixed material agglomerates containing fibers in a first step S1 by means of a dry mechanical treatment and simultaneously achieving a fractionation into different size fractions 04.

Size fractions 04 thus produced can be selectively used further in steps S2 and S3. Detaching device 03 can be a tumbler screen, for example. In the tumbler screen, mechanical vibrations acting on the mixed material agglomerates containing fibers detach particles from the mixed material agglomerates. The finest or most fine-grained fractions produced in detaching device 03 are either directly separated for subsequent smelting or supplied to another fractionating device 07, which effects another fractionation. For example, fractionating device 07 can be an air separation table 06, in which a light fraction and a heavy fraction are produced in step S3 and a fraction with cyclone dust collected in a filter is additionally separated by suctioning.

The other fractions produced in detaching device 03, which is inlet device 02, can be supplied to a separating device 05 together or one after the other, separating device 05 being configured to reduce the adhesion of fibers, in particular glass fibers, among each other in step S2, in particular by influencing the surface, particularly preferably smoothing the surface, of the fibers, shortening the fibers and/or spatially separating the fibers from each other. Separating device 05 can preferably be a barrel finishing device or a rod mill device operated in dry mode.

Separating device 05 can additionally effect a fractionation of different size fractions 04 also in step S2. For instance, separating device 05, too, can comprise suction means for aspirating finest dust particles and other screening or separating means. In separating device 05, a major part of the mixed material agglomerates containing fibers are broken up or at least made smaller with the result that significant amounts of particles otherwise bound or embedded in the mixed material agglomerates are released and transferred into a flowable state and therefore overall into a state allowing separation or fractionation. One of the fractions produced in separation device 05, which comprises particularly many flowable particles, can be supplied to another fractionating device 07 together with fractions from fractionating device 07 of step S3, for example; other fractionating device 07 can be a tumbler screen 03 and effects further fractionation in step S4. The fractions obtained in this fractionating device 07 can also be selectively processed further. A part can be directly separated for smelting or processing in a refinery in step S6; other fractions can be directly supplied to thermal disposal or landfilling in step S7. Another fraction can be divided or fractionated once more in step S5 by means of another fractionating device 07, such as another air separator 06, these fractions being supplied either to disposal S7 or to smelting S6 for their part.

Tests with the method according to the invention have shown that 90% to 95% of the metal value can be concentrated in less than 30% of the mass of the input mixture. Since this portion or this concentration is metallurgically utilized, only about 70% of the mass of the input mixture remains to be landfilled.

In another step of the method according to the invention, the portion of the mass to be landfilled is reduced further. Since this is a fine-grained material having high calorific value, it lends itself to being used as a refuse-derived fuel.

It is known that residue from powder coatings also have a high calorific value and have to be disposed of as dust at high cost. The powder coatings comprise polyester resins, for example, which begin to flow when compressed by means of matrixes and therefore liquefy into a plastic mass. When a suitable mixture of dusts from the recycling of electric or electronic devices, such as particles with a grain size of less than 3 mm, and preferably greater than 0.1 mm, and from the recycling of powder coatings is formed, refuse-derived fuels, such as pellets, can thus be simply produced by compression.

REFERENCE SIGNS 01 system
02 inlet device
03 detaching device
04 size fraction
05 separating device
06 air separator
07 fractionating device

The invention claimed is:

1. A method for separating dusty material mixtures containing fibers, and further comprising heavy metal and/or precious metal, from recycling of electric or electronic devices, the method comprising:
    at least one step (S1) for mechanically and drily detaching particles from mixed material agglomerates containing fibers; and at least one breakup step (S2) for mechanically and drily breaking up the mixed material agglomerates containing fibers, wherein a fractionation according to particle sizes is carried out simultaneously in the step (S1) of detaching particles, and/or a fractionation according to particle sizes is carried out simultaneously in the breakup step (S2), fractions produced in the method being subjected to smelting or supplied to a refinery wherein, in at least two fractionating steps (S1, S3, S4, S5) producing a fraction of particles less than 100 µm in size in one spatial direction, the respective fractions are sorted out or provided for smelting or for transfer to the refinery.

2. The method according to claim 1, wherein the step (S1) of detaching the particles is executed as a first step.

3. The method according to claim 1, wherein a fractionation of 3 to 8 fractions according to particle sizes is carried out simultaneously in the step (S1) of detaching particles.

4. The method according to claim 1, wherein a fractionation of 2 to 3 fractions according to particle sizes is carried out simultaneously in the breakup step (S2).

5. The method according to claim 1, wherein a manipulation reducing the adhesion of fibers among each other is carried out in the breakup step (S2).

6. The method according to claim 1, wherein a milling and/or grinding process is carried out in the breakup step (S2).

7. The method according to claim 1, further comprising at least one other separating and/or fractionating step (S3, S4, S5).

8. The method according to claim 7, wherein the separating and/or fractionating steps (S3, S4, S5) and the fractions produced therein lead to a ramified material flow, in which two or more fractions from different fractionating steps are merged in at least one point.

9. The method according to claim 8, wherein in at least two fractionating steps producing a fraction of particles less than 50 µm in size in one spatial direction, the respective fraction is sorted out or provided for smelting or for transfer to the refinery (S6).

10. The method according to claim 1, wherein the fibers are glass fibers.

11. The method according to claim 1, wherein the fractions produced are subject to smelting or supplied to the refinery to recover metals.

12. The method according to claim 5, wherein the manipulation is a surface manipulation of the fibers, a shortening of the fibers, and/or a spatial separation of the fibers.

13. The method according to claim 5, wherein the manipulation is a manipulation of a pre-fractionated portion of the material mixture.

14. The method according to claim 6, wherein the milling and/or grinding process is of a pre-fractionated portion of the material mixture.

15. The method according to claim 7, wherein the at least one other separating and/or fractionating step comprises 3 other separating and/or fractionating steps.

16. The method according to claim 7, wherein the material mixture produced by the breakup step (S2) is supplied as material input in at least one fractionating step (S3).

17. The method according to claim 16, wherein the material mixture produced by the breakup step (S2) is a material fraction produced in the breakup step (S2).

18. The method according to claim 8, wherein the two or more fractions from different fractionating steps are from different fractionating devices (04).

19. The method according to claim 9, wherein in each fractionating step (S1, S3, S4, S5) producing a fraction of particles less than 50 µm in size in one spatial direction, the respective fraction is sorted out or provided for smelting or for transfer to the refinery (S6).

* * * * *